UNITED STATES PATENT OFFICE.

PAUL HOERING, OF BERLIN, AND OTTO KIPPE, OF OSNABRÜCK, GERMANY.

METHOD OF PRODUCING IRON ALBUMINATES OF ORGANOMINERAL ACIDS.

1,025,466.   Specification of Letters Patent.   Patented May 7, 1912.

No Drawing.   Application filed July 6, 1907. Serial No. 382,761.

*To all whom it may concern:*

Be it known that we, PAUL HOERING and OTTO KIPPE, subjects of the German Emperor, and residing, respectively, at Berlin and Osnabrück, Germany, have invented a certain new and useful Improved Method of Producing Iron Albuminates of Organomineral Acids, of which the following is a specification.

The subject-matter of the present invention is a process for producing alkali salts of glycero-phosphate of iron-albuminate.

When an aqueous solution of glycero-phosphate of iron in excess and cold is added to an aqueous solution of ovalbumen, no precipitate is obtained, but, on the other hand, the iron salt forms with the albumen a complex compound which is only precipitated by coagulation when the liquid is heated. The glycero-phosphate of iron-albuminate thus precipitated which is insoluble in water dissolves in a dilute solution of sodium carbonate, containing a quantity of sodium carbonate which is molecularly proportionate to the iron. When the solution made in this manner is evaporated, an alkali salt of glycero-phosphate of iron-albuminate which is easily soluble in water is obtained. The alkali salt of the glycero-phosphate of iron-albuminate which is soluble in water is also obtained, as may be understood from the above formation, when the aqueous albumen solution is first precipitated with ferric chlorid, the iron albuminate thus obtained being dissolved in an aqueous solution of glycero-phosphate of alkali, the percentage of alkali of which is equivalent to the quantity of the iron, and evaporated. Also as is preferable for the practical execution of the method for obtaining the same compound, the albuminate obtained by the action of alkali on the albumen can be dissolved in alkali, there being added to the solution an aqueous solution of glycero-phosphate of iron containing a quantity of iron which is molecularly proportionate to the alkali and evaporated. In all cases an alkali salt of glycero-phosphate of iron-albuminate is formed. As the alkali-albuminate is converted into the alkali salt of glycero-phosphate of iron-albuminate, one may also, of course, convert the earth-alkali-albuminate, for example calcium-albuminate, into the corresponding earth-alkali salt of glycero-phosphate of iron-albuminate. Like ovalbumen, other albumen bodies, as, for example casein, may also be worked up to alkali salts or earth-alkali salts of glycero-phosphate of iron-albuminate. When glycero-phosphate of iron acts on casein which is insoluble in water, a glycero-phosphate of iron-albuminate which is insoluble in water is obtained directly which dissolves in dilute solution of sodium carbonate; when the solution is evaporated an alkali salt of glycero-phosphate of iron-caseinate which is soluble in water remains behind. If casein is dissolved in water with an addition of so much alkali that either the acid alkali salt (1.8% NaOH) or the neutral alkali-salt (3.6% NaOH) is produced, and if such a solution is mixed with the quantity of glycero-phosphate of iron which is molecularly proportionate to the alkali, a clear solution of the alkali-salts of the corresponding glycero-phosphate of iron-caseinate likewise results. The iron-salt of the glycero-phosphate of iron-caseinate which is insoluble in water but readily soluble in dilute solution of sodium carbonate is precipitated by excess of iron-salt from these solutions.

In order that the invention may be clearly understood, the following examples are given by way of example:—

Example 1: 100 grms. dry ovalbumen are dissolved in 5 liters of water, mixed with a solution of 30 grms. glycero-phosphate of iron in 250 grms. of water and heated to boiling point. The precipitated brownish coagulate is filtered, washed, dried and powdered. A tasteless powder insoluble in water and of a bright brown color is obtained which has a percentage of 1.55% phosphorus and 4.28% iron and which easily dissolves in a dilute solution of sodium carbonate. If 100 parts of this preparation are dissolved in 1200 parts 1 per cent. solution of sodium carbonate, and if the solution is evaporated on glass plates, shining brown red lamellæ are obtained which dissolve readily in water and contain about 9.5 per cent. water.

Example 2: 100 grms. casein are digested with a solution of 15 grms. glycero-phosphate of iron in 500 grms. water for 24 hours, then filtered and washed with water. The residue, which is insoluble in water, contains bound iron and glycero-phosphoric acid. Analysis shows a percentage of 2% iron and 1.6% phosphorus. The preparation dissolves readily in dilute solution of sodium carbonate. If 100 parts of the preparation are dissolved in 1120 parts of ½ per cent. solution of sodium carbonate and evaporated to dryness, a powder readily soluble in water remains behind having a bright brown color with about 9½ per cent. of moisture.

Example 3: 100 grms. casein are dissolved at the ordinary temperature of a room in 1000 grms. of water with an addition of the quantity of sodium hydroxid solution (1.8 grms NaOH) necessary for the formation of an acid salt, whereupon a 10 per cent. solution of the equivalent quantity of glycero-phosphate of iron (4.7 grms.) in water is added. The precipitate which at first appears disappears almost instantaneously and a reddish yellow liquid is obtained which is evaporated to dryness *in vacuo* and yields a bright brown residue which is a tasteless, odorless powder readily soluble in water and containing a percentage of 0.75% of iron.

Example 4: 100 grms. casein are dissolved in 2 liters of water at the ordinary temperature of a room with an addition of the quantity of sodium-hydroxid solution (3.6 grms. NaOH) necessary for the formation of the neutral salt, whereupon 9.4 grms. glycero phosphate of iron dissolved in 50 grms. water are added to the solution. The resulting precipitate is entirely dissolved again. The same quantity of glycero-phosphate of iron is again added and the iron salt of the glycero-phosphate of iron - caseinate is obtained as a bright brown precipitate insoluble in water. This precipitate is collected on a filtering cloth, dried and pulverized. The preparation is a bright brown tasteless powder which is not soluble in water and which contains 2.09 per cent. phosphorus and 4.24 per cent. iron; the powder is readily soluble in very dilute solution of sodium carbonate, and therefore also in intestinal fluid.

In the production of the above described preparation, instead of the aqueous solutions, alcoholic suspensions may also be employed with advantage, as is substantiated by a further example.

Example 5: 100 grms. dry neutral sodium caseinate are suspended in 200 grms. alcohol of 90 per cent., whereupon a solution of 9.4 grms. glycero-phosphate of iron in 25 grms. water is added with stirring. When digested on the water-bath a brownish reaction product is obtained which is filtered with the aid of suction, washed and dried *in vacuo*. The brownish powder thus obtained is readily soluble in water and contains 1.5 per cent. of iron.

The iron is in a complex form in all the above described compounds. Sulfureted hydrogen causes no change in the aqueous solution; ammonium sulfid produces only a green coloration, but no precipitate. When boiled with ammonia, the solution remains clear and no hydrate of iron is precipitated. The compounds give in aqueous solution with strong mineral acids a precipitate which contains only a portion of the whole of the phosphoric acid of the undecomposed product. Iron-albumen compounds are separated by means of dilute acids. The preparations are easily assimilable, tasteless, iron preparations, which, however, exhibit in addition, according to the nature of the glycero-phosphoric acid which is intimately combined with the albumen, the specific therapeutic action attaching to this latter, which is powerfully supported by the great nutritive value of the preparations.

What we claim as our invention and desire to secure by Letters Patent is:—

1. Process for producing alkali salts of glycero-phosphate of iron-albuminate, which consists in heating the albumen materials with solutions of glycero-phosphate of iron, dissolving the insoluble product obtained in dilute alkali-carbonate solution, and evaporating the solution.

2. As new products, alkali salts of glycero-phosphate of iron - albuminate, which are tasteless, soluble in water, yields no precipitate in solution with sulfureted hydrogen, give a green coloration in solution with ammonia sulfid, give no precipitate of iron-hydroxid with ammonia, give in aqueous solution with strong mineral acids a precipitate which contains only a portion of the whole of the phosphoric acid of the undecomposed product and are capable of being readily assimilated.

In testimony whereof, we affix our signatures in the presence of two witnesses.

PAUL HOERING.
OTTO KIPPE.

Witnesses:
 LUDWIG WENIGHÖFFER,
 FRITZ BAUM.